United States Patent [19]

White et al.

[11] 4,125,660

[45] Nov. 14, 1978

[54] ZERO PRESSURE DEVICE SUCH AS TIRES OR RUN-FLAT RINGS

[75] Inventors: John R. White, Wadsworth; Frank J. Murray, Cuyahoga Falls; Cletus A. Becht, Akron, all of Ohio

[73] Assignee: The Goodyear Tire & Rubber Company, Akron, Ohio

[21] Appl. No.: 751,936

[22] Filed: Dec. 17, 1976

[51] Int. Cl.$^2$ .................. C08G 18/48; C08G 18/14
[52] U.S. Cl. .................. 428/218 A; 152/157; 152/310; 428/305; 428/315; 521/51; 521/173
[58] Field of Search .................. 260/2.5 AM, 2.5 AZ; 152/310, 157; 428/305, 218

[56] References Cited

U.S. PATENT DOCUMENTS

| 3,022,810 | 2/1962 | Lambe | 152/310 |
|---|---|---|---|
| 3,523,918 | 8/1970 | Gonzalez | 260/2.5 AZ |
| 3,605,848 | 9/1971 | Lombardi | 260/2.5 AM |
| 3,661,811 | 5/1972 | Hardy | 260/2.5 AM |
| 3,664,976 | 5/1972 | Evans | 260/2.5 AZ |
| 3,823,833 | 7/1974 | Chung | 260/2.5 AM |
| 3,892,691 | 7/1975 | White | 260/2.5 AM |
| 3,929,730 | 12/1975 | Graefe | 260/2.5 AM |
| 3,939,106 | 2/1976 | Dunleavy | 260/2.5 AM |
| 3,994,329 | 11/1976 | Masson | 152/310 |
| 4,020,001 | 4/1977 | White | 260/2.5 AM |

*Primary Examiner*—C. Warren Ivy
*Attorney, Agent, or Firm*—J. D. Wolfe

[57] ABSTRACT

A zero pressure device is composed of either a microcellular or homogeneous polyurethane made by reacting an organic polyisocyanate with at least three polyols, a monomeric polyol of 2 to 3 hydroxyls having a molecular weight of less than 250, a polyester polyol of 2 to 3 hydroxyls having a molecular weight of 800 to 3000 and a polyether polyol of 2 to 3 hydroxyls having a molecular weight of 4 to 7000. When the zero pressured device is a run-flat ring for a tire-wheel assembly, it has an average density of 60 to 65 pounds per cubic foot and 30 to 42 pounds per cubic foot when it is a tire.

5 Claims, No Drawings

ZERO PRESSURE DEVICE SUCH AS TIRES OR RUN-FLAT RINGS

This invention relates to a liquid injectable moldable polyurethane composition suitable for producing a toroidal or circular shaped articles useful in diverse applications ranging from low performance, low speed, low load applications, to relatively high performance, relatively high speed, high load applications. Particularly, this invention relates to said toroidal shaped articles useful for bicycle and related tires. More specifically, this invention in its more limited aspect, relates to a run flat device of the pneumatic tire type.

Notwithstanding the fact that liquid injectable moldable polyurethane compositions are relatively old and have been used in many diverse applications, they have had a number of shortcomings which limited their usefulness as tires or run flat devices. Namely, some polyurethane compositions had deficiencies in properties such as low resilience, poor hysteresis, to name a few such deficiencies.

This invention provides a polyurethane composition having superior properties for use as tires such as bicycle tires and/or run flat devices. These devices are collectively called zero pressure inflatable means.

These zero pressure inflatable means can be made by charging a liquid polyurethane reaction mixture of the specific type described hereinafter into a suitable mold, preferably near the bottom thereof, and allowing the mixture to react and cure to give a zero pressure inflatable means when removed from the mold.

The specific polyurethane reaction mixtures useful in making the zero pressure inflatable means in one embodiment are formed by forming a mixture of 4,4'-diphenylmethane diisocyanate (MDI) with at least three polyols, said polyols being a monomeric polyol of 2 to 3 hydroxyls having a molecular weight of less than 250, a polyester polyol of about 2 to 3 hydroxyls having a molecular weight of about 800 to 3000 and a polyether polyol of about 2 to 3 hydroxyls having a molecular weight of 4000 to 7000 and reacting said mixture to give a polyurethane of either the porous or the nonporous type depending on whether the mixture contains a blowing agent.

Although the polyurethane reaction mixture can be made by the one-shot, prepolymer or quasi prepolymer methods, a superior product is produced by the quasi prepolymer method in that physical properties are higher and more readily reproduced. The quasi prepolymer produced microcellular polyurethanes have better hysteresis and less rolling resistance, as well as good strength and processing properties which makes the quasi prepolymer method preferred for making the microcellular tires of this invention or homogeneous run-flat devices for use with a wheel and pneumatic tire assembly. The nature of these specific polyurethanes and various ways of making them and utilizing them to make zero inflatable means are further illustrated in the following representative examples where all parts and percentages are by weight unless otherwise indicated.

EXAMPLE I

A bicycle tire was molded by filling a bicycle mold held in vertical position from substantially the bottom of the bead area of the tire with a polyurethane reaction mixture. The reaction mixture was made by injecting the resin blend and the quasi prepolymer into a high pressure injection mixer and then moving the mixture to the mold cavity. The resin blend tank of the machine was charged with a mixture of 91.14 parts of a polypropylene ether triol of about 4800 molecular weight, 6.61 parts of ethylene glycol, 4.05 parts of diethanol carbamate together with 0.01 part of an organotin catalyst, 0.15 part triethylene diamine, 8.0 parts of trichloromonofluoromethane, 2.0 parts of carbon black and the isocyanate side was charged with 78.00 parts of a quasi prepolymer composed of the reaction product of 7 mols of flaked 4,4'-diphenylmethane diisocyanate, normally called flaked MDI and one mol of a polyethylene/butylene adipate of 1000 molecular weight having free NCO content of 16 to 20 percent.

The tire produced from this recipe was a solid one having a microporous center and a skin about one-eighth inch and when mounted on a bicycle wheel had a rolling resistance of 1.25 and was essentially equivalent to that of a standard 65 pounds per square inch inflated commercial rubber pneumatic bicycle tire in riding characteristics and equal in mileage performance to a commercial pneumatic bicycle tire on standard bicycle tire stand test.

EXAMPLE II

A high performance zero pressure tire device of the run flat class, i.e. one for use in a pneumatic tire-wheel assembly was made by using the following recipe:

| Ingredients | Parts |
| --- | --- |
| Polypropylene ether triol, 4800 molecular weight | 80 |
| Ethylene glycol | 11 |
| Diethanol carbamate | 6.7 |
| Dibutyltin dilaurate | 0.0133 |
| Triethylene diamine | 0.045 |
| Organotin catalyst | 0.05 |
| Carbon black | 1.5 |
| Quasi prepolymer | 119.2 |

The quasi prepolymer is the reaction product of 7 mols of flake MDI and one mol of a polyethylene/butylene adipate of 1000 molecular weight.

These ingredients were mixed in a polyurethane mixer and charged by injection into a mold cavity to mold a run-flat ring or device having a 19.25 inch outside diameter (OD) by 13⅝ inch inside diameter (ID) ribbed ring which could be mounted on a standard size 14-inch wheel having a split rim. With this molded polyurethane run-flat ring attached to the wheel and loaded to 1050 pounds per axle. The device ran 41 miles before failure. This was a 246 percent improvement over a similar device made from an all polyetherurethane.

The above recipe was modified by replacing ethylene glycol and diethanol carbamate with 20 parts 1,4-butanediol and reducing the quasi prepolymer from 119.2 parts to 117.5 parts. This recipe produced a run-flat device that ran 53 miles before failure. The run-flat devices produced by these recipes had a dramatic improvement in flexural fatigue and hysteresis properties relative to an all polyetherurethane one-shot one.

It should be noted that the run-flat ring can be attached to wheel by the usual means such as wedging or bolting and then a pneumatic tire is mounted on the wheel over the run-flat ring or device. Each tire contains about a pint of a soap lubricant at the time it is mounted on the wheel to lubricate the run-flat ring as the tire is tested or operated in the deflated condition.

Where the zero pressure device is a run-flat ring for attachment to a wheel, it preferably should have a density of 60 to 65 pounds per cubic foot. On the other hand, the tire should have a density of 20 to 42 pounds per cubic foot to give the desired inflation-like feel to the tire ride and to give it good roll resistance. Actually, the zero pressure devices can be used over the range of densities from about 25 pounds per square inch up to a homogeneous or nonfoamed condition.

Representative members of the monomeric polyols useful in recipes set forth above to make the devices of this invention are 1,4-butanediol, ethylene glycol, diethanol carbamate, sometimes called 2-hydroxyl ethyl-2-hydroxyl ethyl carbamate, and preferably as blends of 10 to 50 percent by weight of ethylene glycol and diethanol carbamate, propylene glycol and trimethylol propane.

Representative polyester polyols useful in recipes set forth above to make the devices of this invention are those produced by esterification of glycols of about 2 to 10 carbon atoms with dicarboxylic acids or their anhydrides containing about 2 to 14 carbon atoms.

Representative polyether polyols useful in recipes set forth above to make the devices of this invention are those produced by propylene oxide condensation on a nucleus material such as glycols or triols and polytetramethylene glycol.

The polyurethanes useful in this invention are the reaction product of 8.4 to 22.7 mols of organic polyisocyanate, preferably solid MDI or liquid MDI, 1.2 to 3.2 mols of a polyester polyol of 800 to 3000 molecular weight, 1 mol of a polyether polyol, preferably polypropylene ether glycol per se or one ethylene oxide capped, 5.2 to 17.8 mols of a curative of the monomeric polyol type.

The recipe preferred for tires comprises 1.0 mol of a polyether polyol, 5.2–9.4 mols of monomeric polyol and 1.2 to 1.9 mols of polyester and 8.4 to 13.6 mols of organic polyisocyanate.

The recipe preferred for run-flat devices comprises one mol of a polyether polyol, 9.4 to 17.8 mols of monomeric polyol, 1.54 to 3.2 mols of polyester polyol and 11.9 to 17.8 mols of organic polyisocyanate.

Sufficient water alone or in combination with auxillary blowing agent such as fluorochlorohydrocarbons and related solvents boiling less than 250° F. are used in these recipes to give the desired density.

While certain representative embodiments and details have been shown for the purpose of illustrating the invention, it will be apparent to those skilled in this art that various changes and modifications may be made therein without departing from the spirit or scope of the invention.

What is claimed is:

1. A zero pressure device composed of a microcellular polyurethane foam having an average density of 60 to 65 pounds per cubic foot for a run-flat device and 30 to 42 pounds per cubic foot for a tire and a center portion having a density less than the density of the outer skin of said device, said microcellular polyurethane being a reaction product of 8.4 to 22.7 mols of an organic polyisocyanate with at least three polyols, each of said three polyols being characterized as follows: 5.2 to 17.8 mols of a polyol of 2 to 3 hydroxyls having a molecular weight of less than 250, 1.2 to 3.2 mols of a polyester polyol of 2 to 3 hydroxyls having a molecular weight of 800 to 3000 and a mol of a polyether polyol of 2 to 3 hydroxyls having a molecular weight of 4000 to 7000, said organic polyisocyanate being selected from the class consisting of solid and liquid methylene-di(-phenylene isocyanate) containing sufficient carbodiimide groups to give an isocyanate functionality of 2.1 to 2.3.

2. The zero pressure device of claim 1 wherein the device is a microcellular tire having a skin with more density than the center portion thereof.

3. The device of claim 1 wherein about 8.4 to 22.7 mols of an organic polyisocyanate is reacted with 1.2 to 3.2 mols of a polyester polyol, one mol of a polyether polyol and 5.2 to 17.8 mols of the polyol having a molecular weight less than 250.

4. The device of claim 3 wherein the organic polyisocyanate is a solid or liquid MDI.

5. The device of claim 4 wherein the organic polyisocyanate is reacted with the polyester polyol to form a quasi-prepolymer and then the quasi-prepolymer is reacted with the other polyols.

* * * * *